L. E. & T. J. BLUNT.
HAME FASTENER.
APPLICATION FILED OCT. 14, 1910.

1,011,403.

Patented Dec. 12, 1911.

2 SHEETS—SHEET 1.

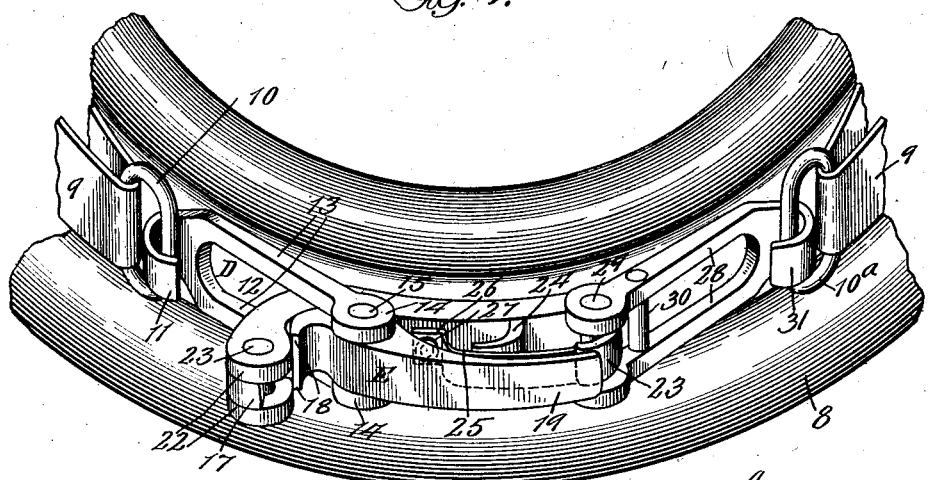
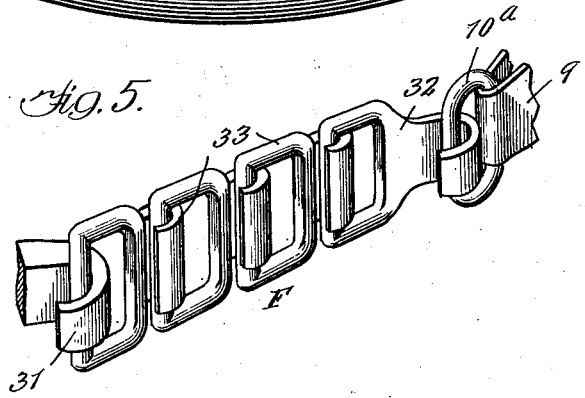
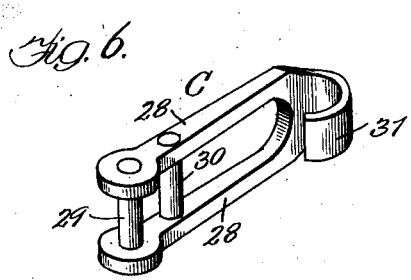

UNITED STATES PATENT OFFICE.

LAURIEN E. BLUNT, OF WILMETTE, AND THOMAS J. BLUNT, OF AUSTIN, ILLINOIS.

HAME-FASTENER.

1,011,403. Specification of Letters Patent. Patented Dec. 12, 1911.

Application filed October 14, 1910. Serial No. 587,068.

*To all whom it may concern:*

Be it known that we, LAURIEN E. BLUNT and THOMAS J. BLUNT, citizens of the United States, residing at Wilmette and Austin, respectively, in the county of Cook and State of Illinois, have invented new and useful Improvements in Hame-Fasteners, of which the following is a full, clear, concise, and exact description, reference being had to the accompanying drawing, forming a part of this specification.

Our invention relates to improvements in hame fasteners and has for its object the production of a device that will positively hold the hames in position and can be quickly fastened and unfastened.

A further object is the production of a device of simple construction of few parts and one that is not liable to get out of order.

Figure 1:
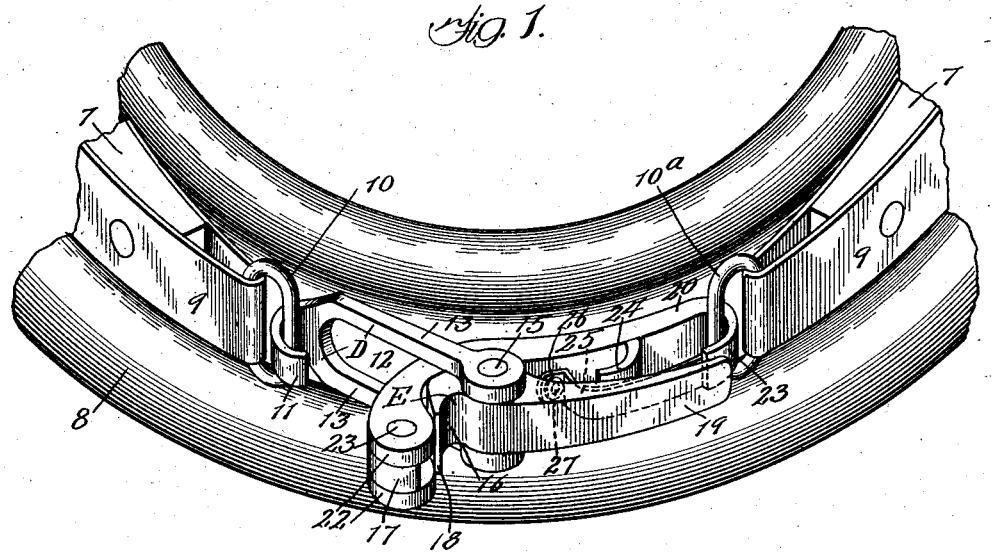
Figure 2:
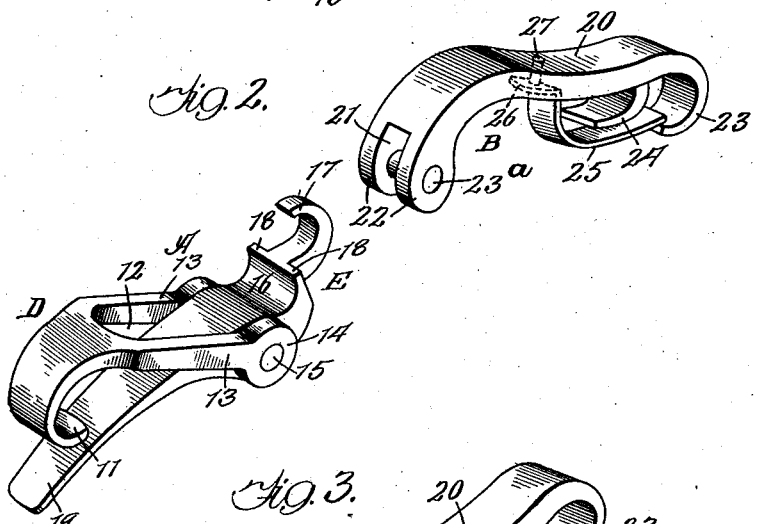
Figure 3:
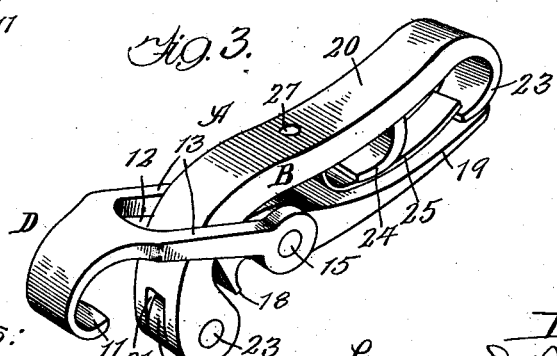

These and such other objects as may hereinafter appear are attained by our device, embodiments of which are illustrated in the accompanying drawings, in which:

Figure 1 represents a perspective view of our device in position, using only two of the elements; Fig. 2 represents a perspective view of the hook lever and a central connection disconnected; Fig. 3 represents a perspective view of the hook lever and a central connection connected; Fig. 4 represents a perspective view of our device in position, using the extension hook; Fig. 5 represents a perspective view of our extension chain; and Fig. 6 represents a perspective view of our extension hook.

Like characters of reference indicate like parts in the several figures of the drawing.

Referring now to the drawings, 7—7 represents a pair of hames of a collar 8. At the lower ends the hames terminate in metallic strips 9 carrying rings or links 10—10ª. The hame fastener connects the two rings 10—10ª and comprises a hook lever A, a central casting B and an extension hook C.

The hook lever A comprises a hook member proper D, the outer end of which is curved downwardly forming a hook 11. The inner end of the hook member is slotted at 12 leaving a pair of yoke arms 13 terminating in enlarged ends 14 formed with eyes within which is mounted a pin 15 forming a journal for the lever member E which has a hooked end 17 of a less width than the body of the lever, thus providing shoulders 18 on either side of the hooked end. The opposite end of the lever is extended forming a curved handle 19.

The member B comprises a curved body member 20 slotted at one end as shown at 21, the yoke or arms 22—22 being connected by a pin 23ª. The slotted end of this member 20 is downturned to provide a knuckle for the shoulder 18 of the lever to bear against. At the opposite end the member B terminates in a hook 23 extending on the same side as the slotted end. At a short distance from the hook 23 a curved ear or lug 24 extends downwardly from the curved body member; following the same general direction as the hooked end 23 forming in fact a supplemental hook. A curved spring guard 25 is provided with a flattened end 26 adapted to fit on the inside of the curved body member and pivotally held in place by means of a rivet 27. This spring guard is adapted to pass over the hook 24 and under the end of the hook 23.

The extension hook C comprises a yoke body 28 having a pin 29 joining its ends. A supplemental pin 30 is mounted between the yoke members a short distance above the pin 29. The end of this member terminates in a hook 31.

In Fig. 5, we have illustrated a chain hook F, comprising a hook member 32 and a plurality of flattened links 33. The point of attachment of the chain to the connecting member is so constructed and related that a free link of the chain may be engaged with the free end of the lever to lock said lever in closed position.

Referring now to the use of our device, ordinarily the lever member A is permanently in place on one of the hames, the hook 11 passing over the link 10 and bent into place so that the member swings permanently from the end of the hame. In a like manner, the member C is ordinarily permanently attached to the other hame link 10ª, the hook 31 being bent in place. The connecting member B is ordinarily secured to the member C in any desired position. In the event that the collar is a small one, the parts are hooked together with the pin 30 engaging the hook 24 and held removably in place by means of the spring guard 25. In the event that it is desired to use this on a larger collar, the parts may be connected with the pin 29 engaging the hook 23. It will thus be seen that before the collar is fastened the lever member A hangs from one hame, and the hook C and connecting member B united hang from the opposite hame. In order to secure the hames in place about the collar, the members A and B are grasped with the left and right hands respectively in the relative position shown in Fig. 2 and brought together, the hook 17 being inserted within the slot 21 and about the pin 23. The handle 19 is then swung downwardly pulling the parts together until they keep the position shown in Figs. 1 and 3, with the handle resting against the top of the hook 23. As the handle is swung upwardly into position, the curved end of the connecting member passes downwardly through the slot 12 between the yoke members 13, the lever being fulcrumed on the pin 23. When the parts are in the relative positions shown in Figs. 1 and 3, the pivotal connection 15 has passed above the line of strain between the parts and is held securely in place. When it is desired to disconnect the hames, it is simply necessary to pull down on the handle 19 until the pin 15 passes the center when the parts may be disconnected by their own weight.

In the event that the device is to be used with a very large collar, the chain extension 5 may be used in connection with the parts A, B and C or may be substituted for the part C, while in the event that the device is to be used in connection with a very small collar, the extension hook C may be omitted entirely and the member B connected directly with the link 10ª. In cases of this kind it will be inadvisable to permanently attach this member to the link 10ª as it can be kept securely in place by means of the spring guard 25.

Heretofore, in fastening hames together complicated and expensive arrangements of buckles, straps and chains have been used that were continually coming apart or rusting in place, making it extremely difficult to remove the hames. By the use of our device however, we provide a simple, cheap and efficient means for securing hames to any desired size of collar and make it possible to readjust the fasteners to fit any desired size of collar by the simplest form of arrangement or rearrangement of the parts.

We claim:

1. In a hame fastener, the combination with a connecting member, adapted for connection to one of the hames, and provided with a knuckle having a pivot, of a hook member adapted for connection to the other hame member, and a lever pivoted to the hook member and provided with a hook and with a shoulder, the hook being adapted to detachably engage the knuckle, and the shoulder to bear upon the knuckle and relieve the strain from the pivot.

2. In a hame fastener, a connecting member having outer and inner rigid hooks, in combination with a resilient guard pivoted to said connecting member and adapted to be swung into or out of engagement with the outer hook and bent or flexed over the inner hook when engaged with the outer hook.

3. In a hame fastener, a connecting member having outer and inner rigid hooks, in combination with a resilient guard pivoted to said connecting member and adapted to be swung into or out of engagement with the outer hook and bent or flexed over the inner hook when engaged with the outer hook, and an extension member adapted to connect the connecting member to one of the hames, said extension member having a plurality of cross members adapted to be engaged with either of the hooks aforesaid.

4. In a hame fastener, the combination with a connecting member, of an attaching member adapted for connection to one of the hames, a lever for engaging the attaching member to the connecting member, and a chain adapted for connection to the other hame and for attachment to the connecting member, the connecting member, the free end of the lever, and the point of attachment of the chain to the connecting member being so constructed and related that a free link of the chain may be engaged with the free end of the lever to lock said lever in closed position.

In witness whereof, we have hereunto subscribed our names in the presence of two witnesses.

LAURIEN E. BLUNT.
    THOMAS J. BLUNT.

Witnesses:
 MABEL REYNOLDS,
 MARGARET SMITH.

---

Copies of this patent may be obtained for five cents each, by addressing the "Commissioner of Patents, Washington, D. C."